United States Patent [19]

Sue et al.

[11] Patent Number: 5,206,333

[45] Date of Patent: Apr. 27, 1993

[54] METHOD OF PRODUCING A NAPHTHOL-MODIFIED PHENOLIC RESIN OF HIGHLY INCREASED MOLECULAR WEIGHT

[75] Inventors: Haruaki Sue; Ken Nanaumi, both of Shimodate; Takuji Itou, Ibaraki; Ken Madarame; Shinsuke Hagiwara, both of Shimodate, all of Japan

[73] Assignee: Hitachi Chemical Company, Ltd., Tokyo, Japan

[21] Appl. No.: 879,363

[22] Filed: May 7, 1992

[30] Foreign Application Priority Data

May 7, 1991 [JP] Japan .................................. 3-101152
May 7, 1991 [JP] Japan .................................. 3-101153

[51] Int. Cl.$^5$ ........................ C08G 8/04; C08G 14/40
[52] U.S. Cl. ................................... 528/139; 528/129; 528/137; 528/140; 528/143; 528/144; 528/153; 528/155; 528/163
[58] Field of Search ............... 528/129, 137, 139, 140, 528/143, 153, 155, 144, 163

[56] References Cited

U.S. PATENT DOCUMENTS

| | | | |
|---|---|---|---|
| 4,404,357 | 10/1983 | Taylor et al. | 528/153 |
| 4,424,315 | 1/1984 | Taylor et al. | 528/153 |
| 4,551,409 | 11/1985 | Gulla et al. | 430/192 |
| 4,725,523 | 2/1988 | Miura et al. | 528/153 |
| 5,023,311 | 6/1991 | Kubota | 528/155 |

*Primary Examiner*—John Kight, III
*Assistant Examiner*—Richard Jones
*Attorney, Agent, or Firm*—Antonelli, Terry, Stout & Kraus

[57] ABSTRACT

A copolycondensation of a phenol, a naphthol and formaldehyde proceeds smoothly in the presence of an acid and a metallic element selected from the group consisting of transition metallic elements and metallic elements of Group IIa, Group IIIa, Group IVa, Group Va and Group VIa of the Periodic Table, and a naphthol-modified phenolic resin which has a large molecular weight and does not gel is obtained.

17 Claims, No Drawings

METHOD OF PRODUCING A NAPHTHOL-MODIFIED PHENOLIC RESIN OF HIGHLY INCREASED MOLECULAR WEIGHT

BACKGROUND OF THE INVENTION (a) Field of the Invention

The present invention relates to a method of producing a naphthol-modified phenolic resin which is excellent in heat resistance and insulating properties and is suitable for use as a molding material resin or a hardener for epoxy resins.

(b) Description of the Related Art

Phenolic resins are classified roughly into novolak phenolic resins and resol phenolic resins, both of which exhibit excellent properties as binders of organic or inorganic base materials.

Recently, the requirement for the properties of phenolic resins has become strict, requiring higher heat resistance, higher strength and lower hygroscopicity. A possible means of improving these properties is introduction of comonomers having a fused ring structure, such as naphthols. However, naphthols have a larger reactivity than phenols, so that conventional catalysts for the synthesis of resol resins or novolak resins, such as acids, metal oxides, metal chlorides, metal hydroxides and amines cannot produce resins of high molecular weight.

SUMMARY OF THE INVENTION

An object of the present invention is to provide a method of producing a naphthol-modified phenolic resin by which copolymerization proceeds so smoothly as to enable production of a resin having a highly increased molecular weight without causing gelation.

The inventors studied the reaction between compounds having naphthalene structure, namely naphthols, and aldehydes, and they consequently completed the present invention.

That is, the present invention provides a method of producing a naphthol-modified phenolic resin which method comprises allowing a phenol (P), a naphthol (N) and formaldehyde (F) to react in quantities which provide a mol % of the phenol ranging from 95 to 5 mol % and a mol % of the naphthol ranging from 5 to 95 mol %, each based on the total of the phenol and the naphthol, and a molar ratio of formaldehyde to the total of the phenol and the naphthol $\{F/(P+N)\}$ ranging from 0.5 to 2.0, in the presence of metallic element selected from the group consisting of a transition metallic elements and metallic elements of Group IIa, Group IIIa, Group IVa, Group Va and Group VIa of the Periodic Table (1983) and in the presence of an acid.

According to the present invention, an addition condensation of naphthols and phenols with formaldehyde is carried out by using specific metallic elements and acids as catalysts, thereby enabling control of the chemical structure, molecular weight and molecular weight distribution of obtained naphthol-modified phenolic resins. Also, according to the present invention, it is possible to produce naphthol-modified phenolic resins having a large molecular weight. The naphthol-modified phenolic resins produced by the method of the present invention are excellent in heat resistance and have low hygroscopicity.

DESCRIPTION OF THE PREFERRED EMBODIMENTS

According to the present invention, a naphthol and a phenol are used in quantities which provide a mol % of the phenol ranging from 95 to 5 mol % and a mol % of the naphthol ranging from 5 to 95 mol %, each based on the total of the phenol and the naphthol. A ratio of the naphthol less than the above-described range hardly take the effects of naphthol-modification. The molar ratio of formaldehyde to the total of the phenol and the naphthol $\{F/(P+N)\}$ ranges from 0.5 to 2.0, preferably from 0.8 to 1.3. If the molar ratio of formaldehyde is less than 0.5, the molecular weight will be decreased, and if it is more than 2.0, gelation will occur.

In order to provide formaldehyde for the addition condensation of the present invention, various kinds of formaldehyde-generating compounds may be used. The concentration of formaldehyde in formaldehyde-generating compounds is not particularly limited insofar as the formaldehyde-generating compounds are used in a quantity which provides the molar ratio $\{F/(P+N)\}$ ranging from 0.15 to 2.0. Typical examples of the formaldehyde-generating compounds include formalin, paraformaldehyde and trioxymethylene.

Phenols which may be used as the phenol in the present invention are not particularly limited, and those used for the synthesis of conventional phenolic resins, such as phenol, cresol, nonylphenol, tert-butylphenol and xylenol, may be used.

Typical examples of the naphthol which may be used in the present invention include 1-naphthol and 2-naphthol.

Metallic elements which may be used as the metallic element catalyst in the method of producing the naphthol-modified phenolic resin according to the present invention include transition metallic elements, such as chromium, manganese, nickel, cobalt, zinc, iron and copper, metallic elements of Group IIa of the Periodic Table, such as magnesium, metallic elements of Group IIIa of the Periodic Table, such as aluminum, gallium and indium, metallic elements of Group IVa of the Periodic Table, such as silicon, germanium, tin and lead, metallic elements of Group Va of the Periodic Table, such as phosphorus, arsenic and antimony, and metallic elements of Group VIa of the Periodic Table, such as sulfur, selenium and tellurium. Examples of the metallic elements which may be used in the present invention are not limited to those exemplified above, and other metallic elements of transition metallic elements and metallic elements of Groups IIa, IIIa, IVa, Va and VIa of the Periodic Table also may be used. These metallic elements may be used in the reaction system individually or as a mixture of two or more of them. The quantity of the metallic element to be used in the present invention is not particularly limited. Generally, the metallic element is used in a quantity of 0.0001 to 0.05 mol, preferably 0.0005 to 0.002 mol, per one mol of the total of the phenol and the naphthol.

The acid which may be used as an acid catalyst in the present invention is not particularly limited, and either of a weak acid and a strong acid may be used. Typical examples of the acid include oxalic acid, tartaric acid, succinic acid, citric acid, hydrochloric acid, sulfuric acid and p-toluenesulfonic acid. The quantity of the acid to be used as an acid catalyst is not particularly limited, and preferred quantity is 0.0001 to 100 moles per one mol of the metallic element used.

The reaction conditions for the production of the naphthol-modified phenolic resin are not particularly limited. When the phenol and naphthol are used in quantities which provide a mol % of the phenol ranging from 95 to 20 mol % and a mol % of the naphthol ranging from 5 to 80 mol %, each based on the total of the phenol and the naphthol, the addition condensation of the phenol, the naphthol and formaldehyde proceeds easily in the absence of organic solvents. Herein, organic solvents means organic solvents other than those contained in the formaldehyde-generating compounds used for the addition condensation. In such a case, the addition condensation is generally carried out at a temperature ranging from 100° to 110° C. under reflux. The reaction time under reflux depends on the kind and quantity of the catalyst used, and is generally 1 to 50 hours. After completion of the reflux and addition condensation in a reaction vessel, thus obtained reaction product is dehydrated at a reduced pressure at a temperature of 230° C. or lower until the reaction product has a desired softening point, and the resulting resin is then removed from the reaction vessel and cooled to obtain a desired novolak naphthol-modified phenolic resin.

When the phenol and naphthol are used in quantities which provide a mol % of the phenol ranging from 20 to 5 mol % and a mol % of the naphthol ranging from 80 to 95 mol %, each based on the total of the phenol and the naphthol, it is preferable to carry out the addition condensation by a solution polymerization in the presence of a ketone solvent. In such a case, the addition condensation is carried out preferably at the boiling point of the ketone solvent used under reflux. The reaction time under reflux depends on the kind and quantity of the catalysts used, and it is generally 1 to 50 hours.

The ketone solvent which may be used in the present invention is not particularly limited, and typical examples of the ketone solvent include acetone, methyl ethyl ketone, 2-pentanone, 2-hexanone, 2-methyl-4-pentanone, 2-methyl-4-heptanone and cyclohexanone. The quantity of the ketone solvent is preferably 100 to 500 parts by weight per 100 parts by weight of the total of the phenols and the naphthols used.

Thus obtained novolak naphthol-modified phenolic resin are applicable to various uses, such as a molding material, a hardener for epoxy resins, a resin material for castings and a friction material.

Hereinafter, the present invention will be described in details referring to the following Examples, but the Examples do not limit the scope of the present invention.

EXAMPLES 1 TO 10 AND COMPARATIVE EXAMPLES 1 TO 3

EXAMPLE 1

Into a 2-liter flask equipped with a stirrer, a condenser and a thermometer placed were 72 g of 1-naphthol, 423 g of phenol, 323 g of 37% formaldehyde, 0.3 g of aluminum powder and 2.52 g of oxalic acid, and were then allowed to react for 4 hours under reflux. The reaction mixture was then dehydrated at a reduced pressure of 700 mmHg while the temperature was elevated up to 200° C., to obtain 500 g of a solid resin. In the present invention, a high speed liquid chromatography L6000 (produced by Hitachi, Ltd.) and a data analyzer C-R4A (produced by Shimazu Corp.) were used as GPC apparatuses for the measurements of molecular weight and molecular weight distribution. Two KF-804L columns (produced by Showa Denko K. K.) were used as GPC columns. By using these apparatuses, the molecular weight $Mn$ of the solid resin was measured to be 904, and the molecular weight distribution $Mw/Mn$ was measured to be 3.3 (hereinafter, number average molecular weight will be called "$Mn$" for short, and weight average molecular weight "$Mw$").

EXAMPLE 2

Into a 2-liter flask equipped with a stirrer, a condenser and a thermometer placed were 215 g of 1-naphthol, 329 g of phenol, 162 g of 37% formaldehyde, 77 g of 86% paraformaldehyde, 0.3 g of gallium and 0.3 g of oxalic acid, and were then heated. After reaction was carried out for 36 hours under reflux, the reaction mixture was then dehydrated at a reduced pressure of 700 mmHg while the temperature was elevated up to 200° C., to obtain 510 g of a solid resin. $Mn=776$, $Mw/Mn=3.1$.

EXAMPLE 3

Into a 2-liter flask equipped with a stirrer, a condenser and a thermometer placed were 215 g of 1-naphthol, 329 g of phenol, 162 g of 37% formaldehyde, 77 g of 86% paraformaldehyde, 0.3 g of aluminum powder and 1.25 g of oxalic acid, and were then heated. After reaction was carried out for 5 hours under reflux, the reaction mixture was dehydrated at a reduced pressure of 700 mmHg while the temperature was elevated up to 220° C., to obtain 480 g of a solid resin. $Mn=869$, $Mw/Mn=3.6$.

EXAMPLE 4

Into a 2-liter flask equipped with a stirrer, a condenser and a thermometer placed were 360 g of 1-naphthol, 235 g of phenol, 162 g of 37% formaldehyde, 77 g of 86% paraformaldehyde, 0.3 g of aluminum powder and 1.5 g of succinic acid, and were then heated. Paraformaldehyde was dissolved gradually, and was dissolved completely in the vicinity of 100° C. After reaction was carried out for 5 hours under reflux, the reaction mixture was dehydrated at a reduced pressure of 700 mmHg while the temperature was elevated up to 220° C., to obtain 510 g of a solid resin. $Mn=968$, $Mw/Mn=6.2$.

EXAMPLE 5

Into a 2-liter flask equipped with a stirrer, a condenser and a thermometer placed were 360 g of 1-naphthol, 235 g of phenol, 162 g of 37% formaldehyde, 140 g of 86% paraformaldehyde, 0.3 g of aluminum powder and 2.5 g of oxalic acid, and were then heated. After reaction was carried out for 3 hours under reflux, the reaction mixture was dehydrated at a reduced pressure of 700 mmHg while the temperature was elevated up to 200° C., to obtain 500 g of a solid resin. $Mn=982$, $Mw/Mn=4.0$.

EXAMPLE 6

Into a 2-liter flask equipped with a stirrer, a condenser and a thermometer placed were 215 g of 2-naphthol, 329 g of phenol, 122 g of 37% formaldehyde, 70 g of 86% paraformaldehyde, 0.3 g of aluminum powder and 1.3 g of oxalic acid. Paraformaldehyde was dissolved gradually and was dissolved completely in the vicinity of 100° C. After reaction was carried out for 5 hours under reflux, the reaction mixture was dehydrated at a reduced pressure of 700 mmHg while the temperature was elevated up to 200° C., to obtain 490 g of a solid resin. Mn=505, Mw/Mn=2.0.

EXAMPLE 7

Into a 2-liter flask equipped with a stirrer, a condenser and a thermometer placed were 72 g of 2-naphthol, 423 g of phenol, 162 g of 37% formaldehyde, 77 g of 86% paraformaldehyde, 0.3 g of aluminum powder and 1.25 g of oxalic acid, and were then heated. Paraformaldehyde was dissolved gradually, and was dissolved completely in the vicinity of 100° C. After reaction was carried out for 3 hours under reflux, the reaction mixture was dehydrated at a reduced pressure of 700 mmHg while the temperature was elevated up to 200° C., to obtain 450 g of a solid resin Mn=635, Mw/Mn=2.6.

EXAMPLE 8

Into a 2-liter flask equipped with a stirrer, a condenser and a thermometer placed were 72 g of 2-naphthol, 423 g of phenol, 162 g of 37% formaldehyde, 140 g of 86% paraformaldehyde, 0.5 g of gallium and 2 g of oxalic acid, and were then heated. Paraformaldehyde was dissolved gradually, and was dissolved completely in the vicinity of 100° C. After reaction was carried out for 6 hours under reflux, the reaction mixture was dehydrated at a reduced pressure of 700 mmHg while the temperature was elevated up to 220° C., to obtain 500 g of a solid resin. Mn=1400, Mw/Mn=5.4

COMPARATIVE EXAMPLE 1

Into a 2-liter flask equipped with a stirrer, a condenser and a thermometer placed were 215 g of 1-naphthol, 215 g of phenol, 162 g of 37% formaldehyde, 140 g of 86% paraformaldehyde and 20 ml of 5-N hydrochloric acid, and were then heated. Paraformaldehyde was dissolved gradually, and was completely dissolved in the vicinity of 100° C. After reaction was carried out for 3 hours under reflux, the reaction mixture was dehydrated at a reduced pressure of 700 mmHg while the temperature was elevated up to 180° C., but the reaction mixture set to gel.

COMPARATIVE EXAMPLE 2

Into a 2-liter flask equipped with a stirrer, a condenser and a thermometer placed were 72 g of 2-naphthol, 423 g of phenol, 162 g of 37% formaldehyde, 140 g of 86% paraformaldehyde and 5.5 g of aluminum oxalate, and were then heated. Paraformaldehyde was dissolved gradually, and was dissolved completely in the vicinity of 100° C. After reaction was carried out for 6 hours under reflux, the reaction mixture was dehydrated at a reduced pressure of 700 mmHg while the temperature was elevated up to 160° C., but the reaction mixture set to gel.

EXAMPLE 9

Into a 2-liter flask equipped with a stirrer, a condenser and a thermometer placed were 300 g of acetone, 144 g of 1-naphthol, 9.4 g of phenol, 40.5 g of 37% formaldehyde, 24 g of 86% paraformaldehyde, 0.15 g of manganese and 0.3 g of oxalic acid, and were heated. After reaction was carried out for 15 hours under reflux, the reaction mixture was reprecipitated in methanol, to obtain 160 g of a solid resin. Mn=806, Mw/Mn=2.2.

EXAMPLE 10

Into a 2-liter flask equipped with a stirrer, a condenser and a thermometer placed were 400 g of 2-methyl-4-heptanone, 144 g of 1-naphthol, 15 g of phenol, 40.5 g of 37% formaldehyde, 27 g of 86% paraformaldehyde, 0.1 g of aluminum powder and 1.25 g of oxalic acid, and were then heated. After reaction was carried out for 10 hours under reflux, the reaction mixture was reprecipitated in methanol, to obtain 170 g of a solid resin. Mn=842, Mw/Mn=2.9.

COMPARATIVE EXAMPLE 3

Into a 2-liter flask equipped with a stirrer, a condenser and a thermometer placed were 144 g of 1-naphthol, 15 g of phenol, 40.5 g of 37% formaldehyde, 27 g of 86% paraformaldehyde and 20 ml of 2-N hydrochloric acid, and were then heated. Paraformaldehyde was dissolved gradually, and was dissolved completely in the vicinity of 100° C. After reaction was carried out for 3 hours under reflux, the reaction mixture was dehydrated at a reduced pressure of 700 mmHg while the temperature was elevated up to 230° C., but the reaction mixture set to gel.

What is claimed is:

1. A method of producing a highly increased molecular weight naphthol-modified phenolic resin by inhibiting gellation time, comprising: allowing a phenol (P), a naphthol (N) and formaldehyde (F) to react in quantities which provide a mol % of the phenol ranging from 95 to 5 mol % and a mol % of the naphthol ranging from 5 to 95 mol %, each based on the total of the phenol and the naphthol, and a molar ratio of formaldehyde to the total of the phenol and the naphthol $\{F/(P+N)\}$ ranging from 0.5 to 2.0, in the presence of a metallic element selected from the group consisting of transition metallic elements and metallic elements of Group IIa, Group IIIa, Group IVa, Group Va and Group VIa of the Periodic Table and in the presence of an acid.

2. The method as claimed in claim 1, wherein the metallic element is selected from the group consisting of chromium, manganese, nickel, cobalt, zinc, iron, copper, magnesium, aluminum, gallium, indium, silicon, germanium, tin, lead, phosphorus, arsenic, antimony, sulfur, selenium and tellurium, and the metallic element is used in a quantity of 0.0001 to 0.05 mol per one mol of the total of the phenol and the naphthol.

3. The method as claimed in claim 1, wherein the phenol is selected from the group consisting of phenol, cresol, nonylphenol, tert-butylphenol and xylenol, and the naphthol is 1-naphthol or 2-naphthol.

4. The method as claimed in claim 1, wherein the acid is selected from the group consisting of oxalic acid, tartaric acid, succinic acid, citric acid, hydrochloric acid, sulfuric acid and p-toluenesulfonic acid, and the acid is used in a quantity of 0.0001 to 100 mol per one mol of the metallic element.

5. The method as claimed in claim 2, wherein the phenol is selected from the group consisting of phenol, cresol, nonylphenol, tert-butylphenol and xylenol, the naphthol is 1-naphthol or 2-naphthol, the acid is selected from the group consisting of oxalic acid, tartaric acid, succinic acid, citric acid, hydrochloric acid, sulfuric acid and p-toluenesulfonic acid, and the acid is used in a quantity of 0.0001 to 100 mol per one mol of the metallic element.

6. The method as claimed in claim 5, wherein the metallic element is aluminum, gallium or manganese, the phenol is phenol, and the acid is oxalic acid, succinic acid or hydrochloric acid.

7. The method as claimed in claim 1, wherein the quantity of the phenol is 20 to 95 mol % and the quantity of the naphthol is 80 to 5 mol %, each based on the total of the phenol and the naphthol, and the reaction of the phenol, the naphthol and formaldehyde is carried out in the absence of an organic solvent.

8. The method as claimed in claim 7, wherein the metallic element is selected from the group consisting of chromium, manganese, nickel, cobalt, zinc, iron, copper, magnesium, aluminum, gallium, indium, silicon, germanium, tin, lead, phosphorus, arsenic, antimony, sulfur, selenium and tellurium, the metallic element is used in a quantity of 0.0001 to 0.05 mol per one mol of the total of the phenol and the naphthol, the phenol is selected from the group consisting of phenol, cresol, nonylphenol, tert-butylphenol and xylenol, the naphthol is 1-naphthol or 2-naphthol, the acid is selected from the group consisting of oxalic acid, tartaric acid, succinic acid, citric acid, hydrochloric acid, sulfuric acid and p-toluenesulfonic acid, and the acid is used in a quantity of 0.0001 to 100 mol per one mol of the metallic element.

9. The method as claimed in claim 8, wherein the metallic element is aluminum, gallium or manganese, the phenol is phenol, and the acid is oxalic acid, succinic acid or hydrochloric acid.

10. The method as claimed in claim 9, wherein the metallic element is aluminum or gallium, and the acid is oxalic acid or succinic acid.

11. The method as claimed in claim 1, wherein the quantity of the phenol is 5 to 20 mol % and the quantity of the naphthol ranges from 95 to 80 mol %, each based on the total of the phenol and the naphthol, and the reaction of the phenol, the naphthol and formaldehyde is carried out in a ketone solvent.

12. The method as claimed in claim 11, wherein the metallic element is selected from the group consisting of chromium, manganese, nickel, cobalt, zinc, iron, copper, magnesium, aluminum, gallium, indium, silicon, germanium, tin, lead, phosphorus, arsenic, antimony, sulfur, selenium and tellurium, the metallic element is used in a quantity of 0.0001 to 0.05 mol per one mol of the total of the phenol and the naphthol, the phenol is selected from the group consisting of phenol, cresol, nonylphenol, tert-butylphenol and xylenol, the naphthol is 1-naphthol or 2-naphthol, the acid is selected from the group consisting of oxalic acid, tartaric acid, succinic acid, citric acid, hydrochloric acid, sulfuric acid and p-toluenesulfonic acid, and the acid is used in a quantity of 0.0001 to 100 mol per one mol of the metallic element.

13. The method as claimed in claim 11, wherein the ketone solvent is selected from the group consisting of acetone, methyl ethyl ketone, 2-pentanone, 2-hexanone, 2-methyl-4-heptanone, 2-methyl-4-pentanone and cyclohexanone, and the ketone solvent is used in a quantity of 100 to 500 parts by weight per 100 parts by weight of the total of the phenol and the naphthol.

14. The method as claimed in claim 13, wherein the metallic element is selected from the group consisting of chromium, manganese, nickel, cobalt, zinc, iron, copper, magnesium, aluminum, gallium, indium, silicon, germanium, tin, lead, phosphorus, arsenic, antimony, sulfur, selenium and tellurium, the metallic element is used in a quantity of 0.0001 to 0.05 mol per one mol of the total of the phenol and the naphthol, the phenol is selected from the group consisting of phenol, cresol, nonylphenol, tert-butylphenol and xylenol, the naphthol is 1-naphthol or 2-naphthol, the acid is selected from the group consisting of oxalic acid, tartaric acid, succinic acid, citric acid, hydrochloric acid, sulfuric acid and p-toluenesulfonic acid, and the acid is used in a quantity of 0.0001 to 100 mol per one mol of the metallic element.

15. The method as claimed in claim 14, wherein the metallic element is aluminum, gallium or manganese, the phenol is phenol, the acid is oxalic acid, succinic acid or hydrochloric acid, and the ketone solvent is acetone or 2-methyl-4-heptanone.

16. The method as claimed in claim 15, wherein the naphthol is 1-naphthol, the metallic element is aluminum or manganese, the acid is oxalic acid, and the ketone solvent is acetone or 2-methyl-4-heptanone.

17. The method as claimed in claim 1, wherein the molar ratio of formaldehyde to the total of the phenol and the naphthol $\{F/(P+M)\}$ ranges from 0.8 to 1.3.

* * * * *